United States Patent [19]
Yasui et al.

[11] Patent Number: 5,661,738
[45] Date of Patent: Aug. 26, 1997

[54] SOLID-STATE LASER AMPLIFYING APPARATUS AND SOLID-STATE LASER APPARATUS CAPABLE OF OSCILLATING HIGH-POWER LASER BEAM UNDER STABLE CONDITION

[75] Inventors: Koji Yasui; Tetsuo Kojima, both of Hyogo, Japan

[73] Assignee: Mitsubishi Denki Kabushiki Kaisha, Tokyo, Japan

[21] Appl. No.: 543,070

[22] Filed: Oct. 13, 1995

[30] Foreign Application Priority Data

Dec. 22, 1994 [JP] Japan ................... 6-319934

[51] Int. Cl.⁶ ................................. H01S 3/094
[52] U.S. Cl. ................. 372/35; 372/72; 372/75
[58] Field of Search ................. 372/35, 75, 72

[56] References Cited

U.S. PATENT DOCUMENTS 5,033,058  7/1991  Cabaret et al. .................. 372/72
5,349,600  9/1994  Shinbori et al. ................ 372/75

FOREIGN PATENT DOCUMENTS 5-259540  10/1993  Japan .

OTHER PUBLICATIONS

D. Golla, S. Knoke, W. Schone, G. Ernst, A. Tunnemann, and H. Welling Laser Zentrum Hannover e. V., Hollerithallee 8, D-30419 Hannover, Germany No date.
Springer-Verlag Berlin Hiedelberg New York London Paris Tokyo Hong Kong Barcelona Budapest Solid-State Laer Engineering Third Completely Revised and Updated Edition No date.

Primary Examiner—James W. Davie
Attorney, Agent, or Firm—Sughrue, Mion, Zinn, Macpeak & Seas

[57] ABSTRACT

In a solid-state laser amplifying apparatus and a solid-state laser apparatus, a high-power laser beam can be produced in a high efficiency under stable condition. The solid-state laser amplifying apparatus is comprised of a solid-state element containing an activated solid medium; a flow tube for causing a cooling medium used to cool the solid-state element to flow therethrough; a light condensing device arranged so as to surround the solid-state element, for holding the flow tube by directly, or indirectly sandwiching the flow tube, an inner surface of which is formed as a diffusion/reflection surface; an excitation light source arranged outside the light condensing device, for emitting excitation light used to excite the solid-state element; and an opening portion provided with the light condensing device, for conducting the excitation light.

15 Claims, 11 Drawing Sheets

SOLID-STATE LASER AMPLIFYING APPARATUS AND SOLID-STATE LASER APPARATUS CAPABLE OF OSCILLATING HIGH-POWER LASER BEAM UNDER STABLE CONDITION

BACKGROUND OF THE INVENTION

The present invention relates to a solid-state laser amplifying apparatus and a solid-state laser apparatus, capable of producing a high-power laser beam with a high quality under stable condition, and having a low-cost structure.

Figure 1:
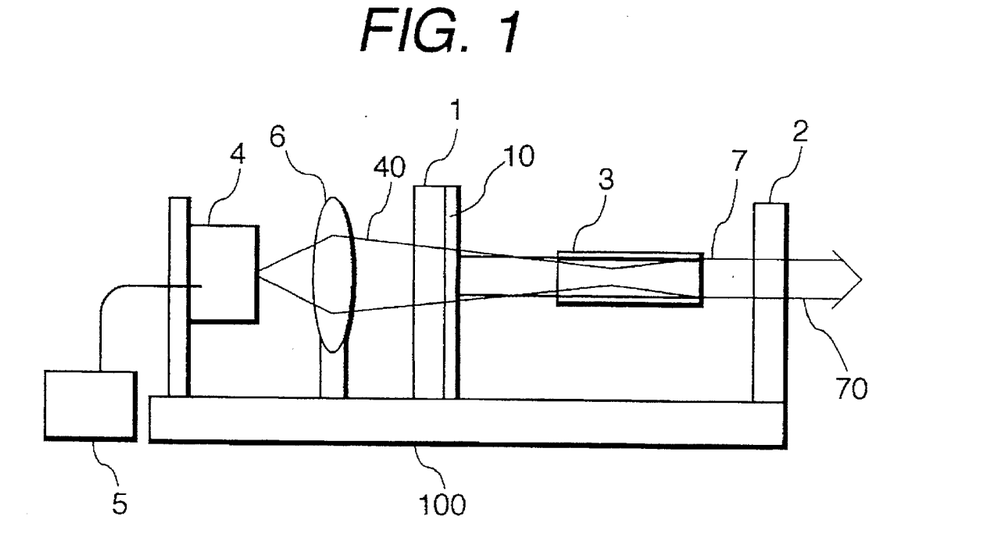
FIG. 1 schematically shows the structure of the conventional solid-state laser apparatus.

FIG. 1 is a side view for representing the structure of the conventional solid-state laser apparatus, or device as described in, e.g., the publication of "Solid-State Laser Engineering", Springer-Verlag, page 119 to 120. In this drawing, reference numeral 1 indicates a reflection mirror, reference numeral 2 shows a partial reflection mirror, reference numeral 3 represents a solid-state element containing an activated solid-state medium. As an example of a YAG laser, this solid-state element corresponds to Nd:YAG (Nd: Yttrium Aluminium Garnet) in which Nd is doped as the activated solid-state medium. Also, reference numeral 4 indicates an excitation light source, for example, a semiconductor laser in which GaAlAs is a major component. Reference numeral 5 denotes a power source for driving the excitation light source, reference numeral 6 shows a condenser lens, and reference numeral 7 is a laser beam produced in a laser resonator constructed by employing mirrors 1 and 2. Reference numeral 10 denotes such an optical thin film that the reflection mirror 1 total-reflects the laser beam 7 and total-transmits the laser beam of the semiconductor laser, reference numeral 40 indicates the laser light emitted from the semiconductor laser 4, reference numeral 70 indicates a laser beam externally derived from the partial reflection mirror 2, and reference numeral 100 shows a base.

The conventional solid-state laser apparatus is so constructed as explained above, in which the laser light of the semiconductor laser 4 energized by the power source 5 is conducted from the edge plane of the solid-state element 3 by the condenser lens 6, and is excited to be used as the laser amplifying medium. The natural emission light emitted from the laser amplifying medium is amplified while this natural emission light is reciprocated between the resonators arranged by the mirror 1 and the mirror 2, and then becomes the laser beam 7 with better directivity. When intensity of this laser beam 7 reaches a preselected value, this laser beam 7 is emitted as the laser beam 70 outside from the resonators.

In the above-described conventional solid-state laser apparatus, since it is so structured that the laser light of the semiconductor laser is conducted from the edge surface the solid-state element, the element portion near this edge surface is intensively excited. When the solid-state element is excited by such a high-power semiconductor laser in order to produce a high-power output, a light intensity distribution would be produced within the solid-state element, so that a beam shape would collapse. As a result, the high-power laser beam with high quality could not be produced.

Figure 2:
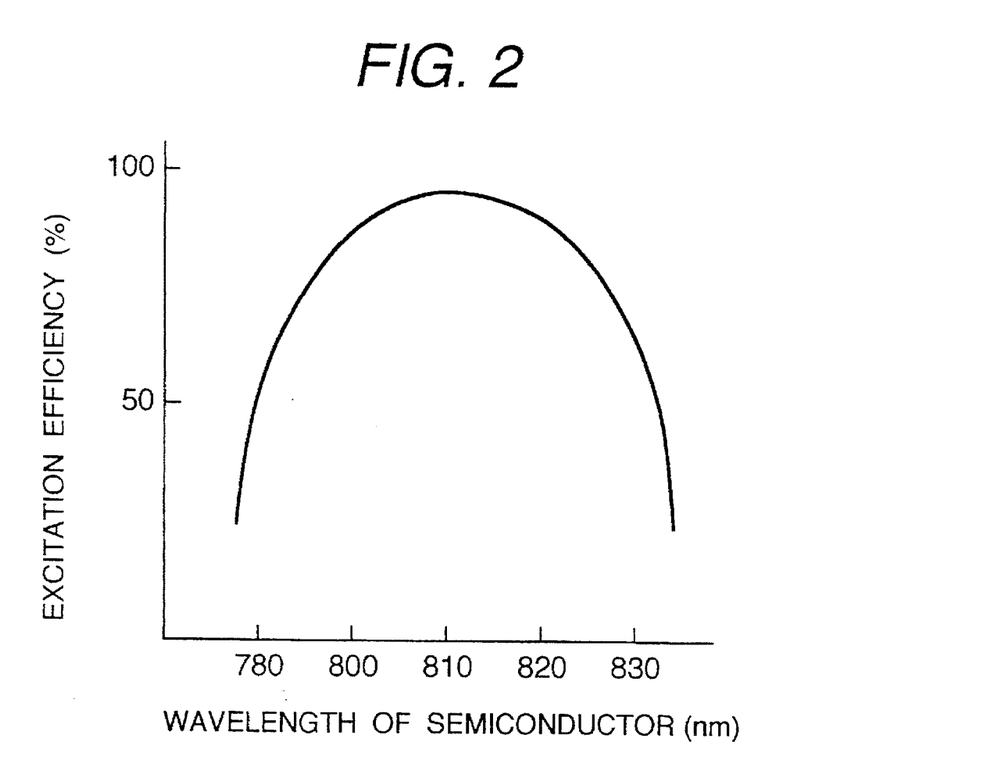
FIG. 2 is an explanatory diagram for explanating the operation of the conventional solid-state laser apparatus.

Furthermore, in the conventional solid-state laser apparatus, since the absorption coefficient of the solid-state element depends upon the wavelength of the semiconductor laser, the wavelength of the semiconductor laser must be made coincident with the absorbing wavelength of the solid-state element in order to achieve a stable operation. FIG. 2 graphically represents a relationship between a wavelength of a semiconductor laser and an excitation efficiency when an Nd:YAG laser is employed as an example. To achieve such a stable operation that the excited oscillation efficiency is made constant, a semiconductor laser whose center wavelength is 810 nm is selected and a temperature thereof must be controlled. As a consequence, there are problems that the structure of the above-explained conventional solid-state laser apparatus becomes complex, the yield of manufacturing the semiconductor laser is lowered, and the manufacturing cost is increased, resulting in a high-cost solid-state laser apparatus.

Additionally, the conventional laser apparatus owns further problems. That is, since the laser apparatus is so arranged that the laser light of the semiconductor laser is condensed by the condenser lens onto one point of the solid-state element in order to be excited, when the beam projection direction of the semiconductor laser is varied due to mechanical vibrations, the location of the excitation unit is changed. Accordingly, a stable laser oscillation could not be established. Also, when one semiconductor laser is replaced by another semiconductor laser due to lifetime thereof, the replaced semiconductor laser must require fine positional/angular adjustments.

SUMMARY OF THE INVENTION

The present invention has been made to solve the above-described problems, and, therefore, has an object to provide a solid-state laser amplifying apparatus and a solid-state laser apparatus, which can be manufactured by simple structures at low cost. More specifically, a solid-state element is uniformly excited from a side surface, so that a high-power laser amplifying medium can be obtained with high quality. Also, even when a wavelength of an excitation light source is varied, an oscillation efficiency becomes constant. Further, even for mechanical vibrations, the solid-state laser can be oscillated under stable condition with less output variation, whereby a high-power laser beam with better quality can be stably produced. The present invention has another object to provide a solid-state laser amplifying apparatus and a solid-state laser apparatus, whose excitation light source is readily replaceable.

In the solid-state laser amplifying apparatus of aspect 1, the excitation light emitted from the excitation light source is conducted into the light condensing device via the opening portion provided with the light condensing device held by the solid-state element for sandwiching the flow tube, and then the solid-state element is excited from the side surface at the stage where this excitation light is widened within the light condensing device. The light which has not been absorbed by the solid-state element is diffused and reflected on the inner surface of the light condensing device, and the diffused/reflected light again excites the solid-state element from the side surface. The excitation light components which have been absorbed by the solid-state element and thus could not become the laser light are converted into a heat, and then the solid-state element heated by this heat is cooled by the cooling medium flowing through the flow tube arranged around the solid-state element.

In the solid-state laser amplifying apparatus of aspect 2, the excitation light emitted from the excitation light source is conducted into the light condensing device from the opening portion provided on the light condensing device whose both edge portions are held by the side plate, and then the solid-state element is excited at the stage where this excitation light is widened within the light condensing device. The light which has not been absorbed by the solid-state element is diffused and reflected on the inner surface of the light condensing device, and the diffused/ reflected light again excites the solid-state element from the side surface. The excitation light components which have been absorbed by the solid-state element and thus could not become the laser lights are converted into heat, and then the solid-state element heated by this heat is cooled by the cooling medium flowing through flow tube arranged around the solid-state element.

In the solid-state laser amplifying apparatus of aspect 3, the excitation light emitted from the excitation light source is conducted into the light condensing device from the opening portion provided on the light condensing device supported by the base plate, and then the solid-state element is excited at the stage where this excitation light is widened within the light condensing device. The light which has not been absorbed by the solid-state element is diffused and reflected on the inner surface of the light condensing device, and the diffused/reflected light again excites the solid-state element from the side surface. The excitation light components which have been absorbed by the solid-state element and thus could not become the laser light are converted into heat, and then the solid-state element heated by this heat is cooled by the cooling medium flowing through the flow tube arranged around the solid-state element.

In the solid-state laser amplifying apparatus of aspect 4, the excitation light emitted from the excitation light source is conducted into the light condensing device via the opening portion provided on the side surface of the light condensing device equipped with the diffraction/reflection surface by way of the optical element for transferring the excitation light by the internal total reflection. Then, the conducted excitation light excites the solid-sate element from the side surface at the stage where this excitation light is widened within the light condensing device. The excitation light which has not been absorbed by the solid-state element is diffused/reflected by the inner surface of the light condensing device, and then the diffused/reflected light excites again the solid-state element from the side surface thereof.

In the solid-state laser amplifying apparatus of aspect 5, the excitation light emitted from the excitation light source is conducted inside the light condensing device through the opening portion formed on the side surface of the light condensing device equipped with the diffusion/reflection surface by way of the optical element for transferring the excitation light by the total reflection caused by the optical thin film. Then, the conducted excitation light again excites the solid-state element from the side surface thereof at the stage where this excitation light is widened within the light condensing device. The excitation light which has not been absorbed by the solid-state element is diffused and reflected on the inner surface of the light condensing device, and the diffused/reflected light again excites the solid-state element from the side surface thereof.

In the solid-state laser amplifying apparatus of aspect 6, the excitation light emitted from the excitation light source is conducted inside the light condensing device through the opening portion formed on the side surface of the light condensing device equipped with the diffusion/reflection surface by way of the optical element having the refractive index distributed in a lens shape. Then, the conducted excitation light again excites the solid-state element from the side surface thereof at the stage where this excitation light is widened within the light condensing device. The excitation light which has not been absorbed by the solid-state element is diffused and reflected on the inner surface of the light condensing device, and the diffused/reflected light again excites the solid-state element from the side surface thereof.

In the solid-state laser amplifying apparatus of aspect 7, a plurality of opening portions are provided, and the respective positions of the plural opening portions are changed in at least one place, as viewed from the axial direction of the solid-state element, so that the incident position of the excitation light onto the solid-state element is varied.

BRIEF DESCRIPTION OF THE DRAWINGS

For a better understanding of the present invention, reference is made of the detailed description to be read in conjunction with the accompanying drawings, in which.

Pigs. 7A to 7C schematically indicate a structure of a solid-state laser apparatus according to an embodiment 2 of the present invention.

DETAILED DESCRIPTION OF THE PREFERRED EMBODIMENTS (EMBODIMENT 1)

Figure 3A:
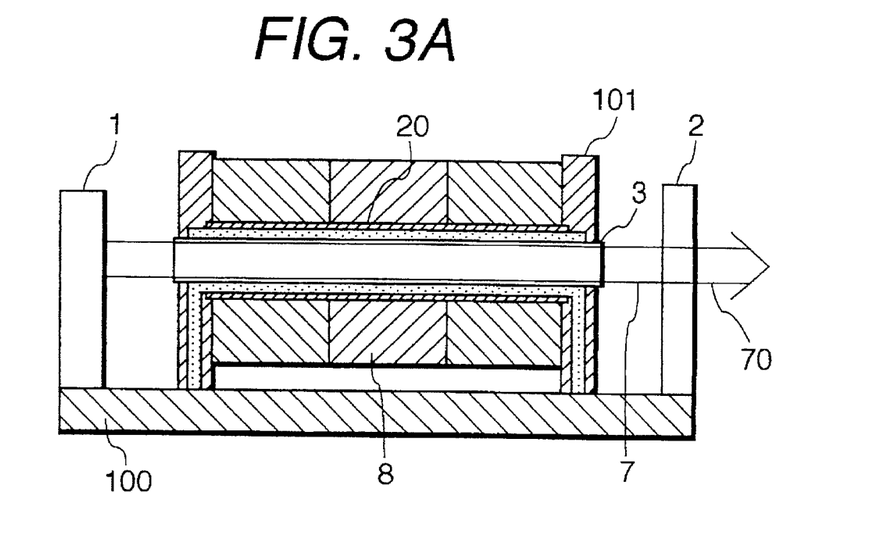
FIGS. 3A to 3C schematically represent a structure of solid-state laser apparatus according to an embodiment 1 of the present invention.
Figure 3B:
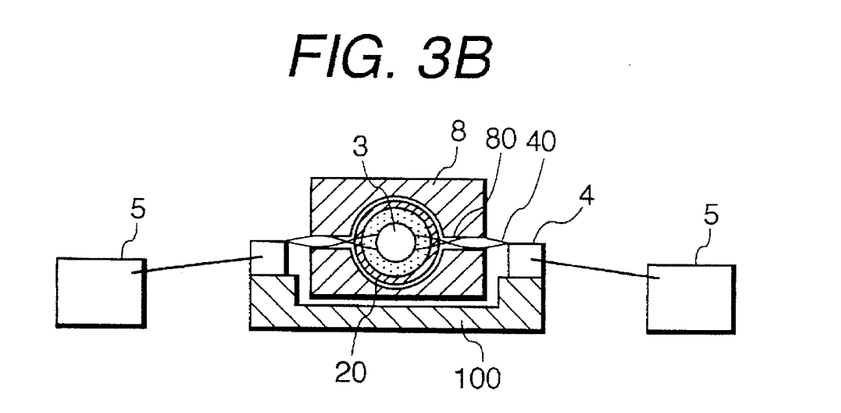
Figure 3C:
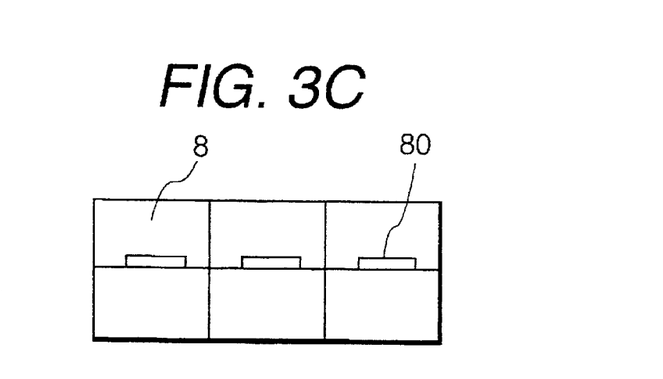

FIG. 3 is a structural diagram of a solid-state laser apparatus according to embodiment 1 of the present invention. More specifically, FIG. 3A is a cross-sectional view of the solid-state laser apparatus of embodiment 1, FIG. 3B is a longitudinal-sectional view of this solid-state laser apparatus, and FIG. 3C is a side surface structural diagram of a light condensing device, as viewed from the transverse direction. In this drawing, reference numerals 1, 2, 3, 4, 5, 7, 40, 70, and 100 depict the same elements as those of the conventional solid-state laser apparatus. Reference numeral 8 indicates a light condensing device positioned so as to surround the solid-state element 3, and whose inner surface is constructed of a diffusion/reflection surface. The light condensing device 8 is constructed in such a manner that a plurality of light condensing devices are arranged along the axial direction of the solid-state element 3. Reference numeral 20 depicts a flow tube. Cooling water flows between this flow tube 2 and the solid-state element 3. Furthermore, the light condensing device 8 holds the flow tube 20 in such a way that the flow tube is sandwiched by the light condensing device 8. Reference numeral 80 is an opening portion opened in a portion of a side surface of the light condensing device 8. Reference numeral 101 indicates a side plate for supporting the flow tube 20.

In the solid-state laser apparatus with the above-described structure, the solid-state element 3 containing the activated solid-state medium is positioned within the light condensing device made of, e.g., ceramic whose inner surface is constructed of the diffusion/reflection surface. The solid-state element 3 is excited by the excitation light 40 which is emitted from the semiconductor laser 4 and conducted from the opening portion 80, and then becomes the laser amplifying medium for amplifying the laser beam. The natural (spontaneous) emission light emitted from the laser amplifying medium is amplified while being reciprocated between the resonators arranged by the mirror 1 and the mirror 2, resulting in a laser beam 7 of better directivity. When the intensity of the laser beam 7 reaches a preselected value, this laser beam 7 is projected outside the laser amplifying medium (shown as laser beam 70).

In the above-described structure, the light of the semiconductor laser which has not been absorbed by the solid-state element 3 passes through the solid-state element, and thereafter is diffused/reflected on the inner surface of the light condensing device. The diffused/reflected light again excites the solid-state element in uniform manner. The excitation efficiency under this condition can be calculated by taking into account the probability of the light reflection number at the diffusion/reflection surface until the light is finally absorbed by the solid-state element.

Figure 4:
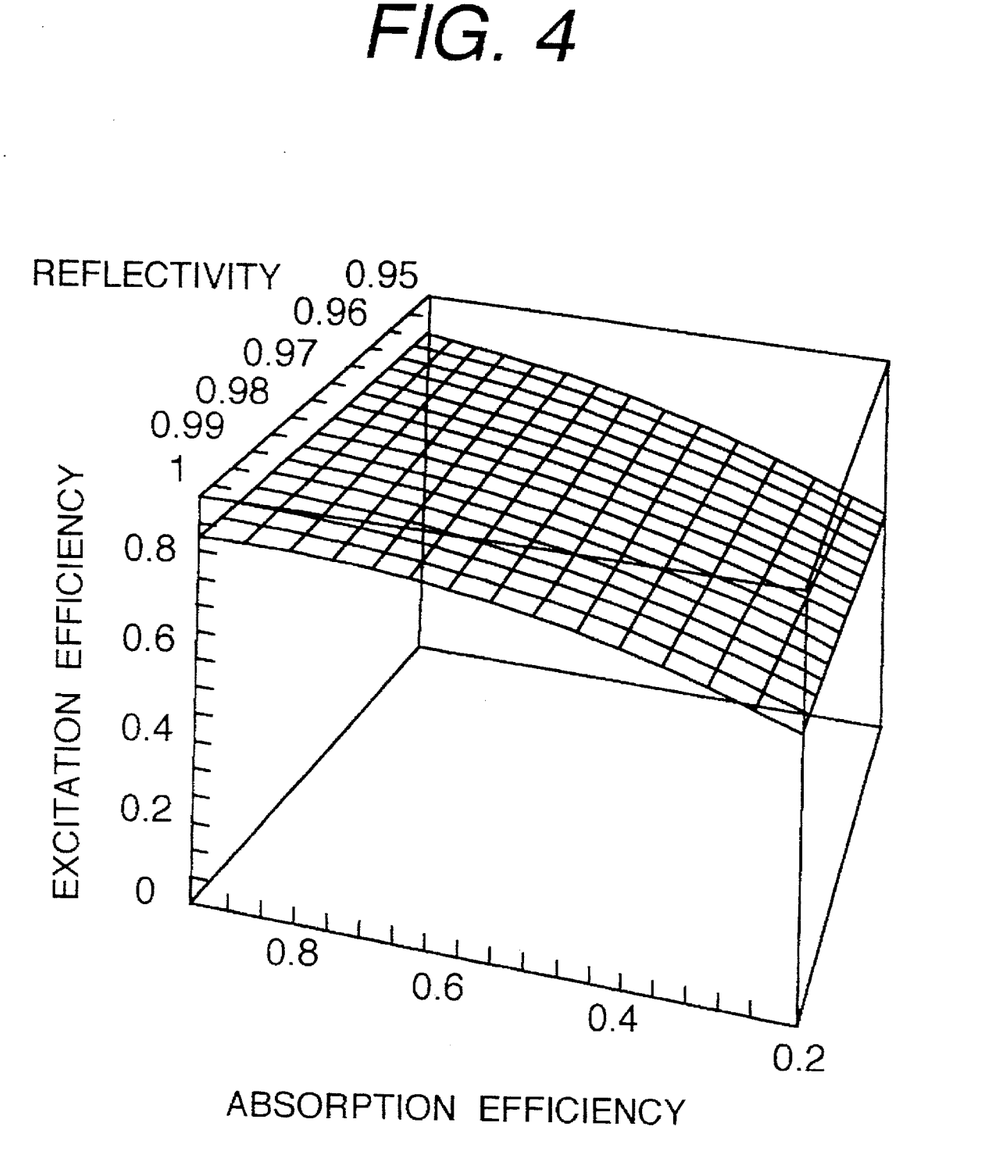
FIG. 4 is an explanatory diagram for explaining operations of the solid-state laser apparatus according to the embodiment 1 of the present invention.

FIG. 4 graphically represents the excitation efficiency of the solid-state element which is calculated as a function based on the reflectivity of the inner surface of the light condensing device, and also shows the excitation efficiency (absorption coefficient) when the excitation light passes through the solid-state element only once. Even when the wavelength of the excitation light, e.g., semiconductor laser light is varied so that the absorption efficiency of the solid-state element is changed between 20% and 100%, it could be understood that a change in the excitation efficiency of the solid-state element is gentle. This implies that such an excitation light source having a wide-range wavelength may be employed, and no severe wavelength control is required, as compared with the conventional solid-state laser amplifying apparatus. As a result, yield of manufacturing of the semiconductor laser is increased, and thus the solid-state laser amplifying apparatus with the simple structure can be realized at low cost.

It should be noted that the light components which have been absorbed not to become the laser light are converted into heat; the solid-state element 3 heated by this heat is cooled by a cooling medium flowing through a flow tube arranged around the solid-state element 3.

Figure 5:
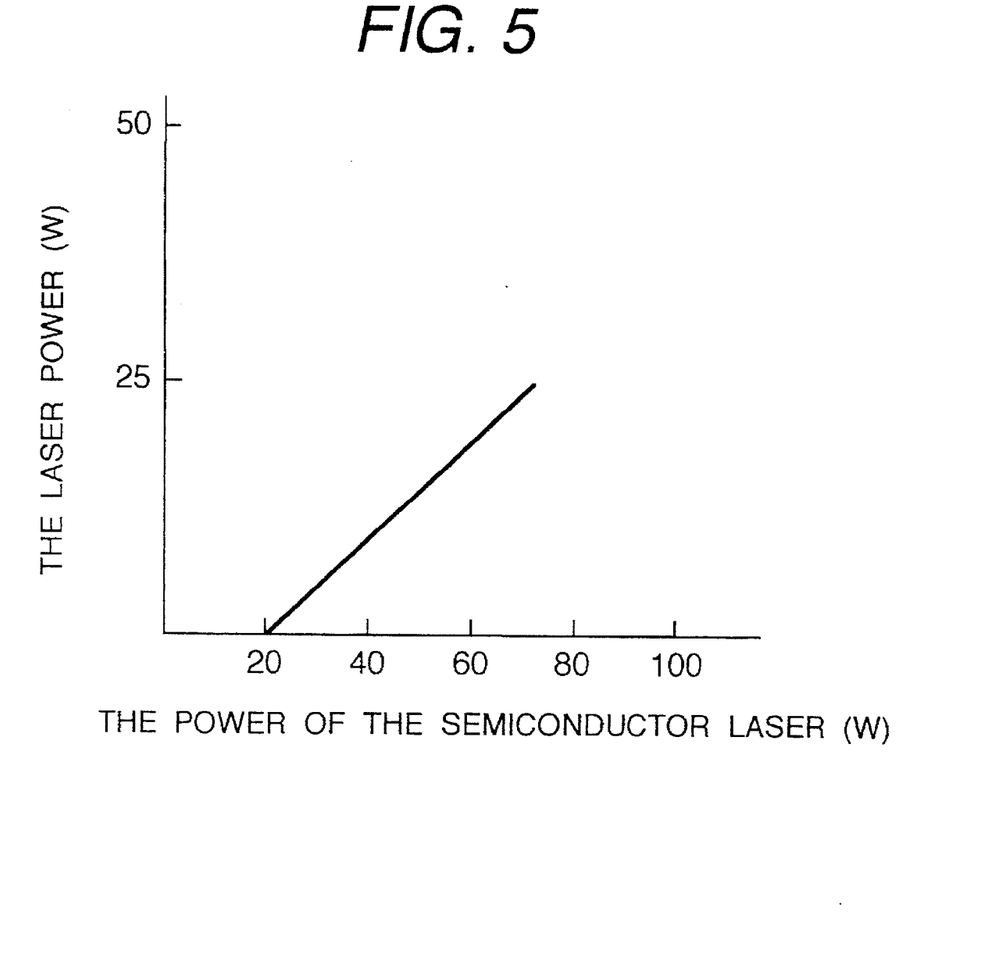
FIG. 5 is another explanatory diagram for explaining operations of the solid-state laser apparatus according to the embodiment 1 of the present invention.

FIG. 5 graphically indicates an oscillation characteristic of the solid-state laser apparatus according to the embodiment 1, which is acquired by experiment. That is, six continuous oscillation type semiconductor lasers 4 containing GaAlAs as the major component were employed which produced specially flat oscillation light having a length of 1 cm and a width of 5 micrometers at near the wave length of 810 nm (nanometers). The laser light produced from each of the semiconductor lasers 4 was conducted through each of the opening portions 80 each having a length of 1.5 cm and a width of 0.5 mm into the light condensing device 8, which were provided on the side surface of the light condensing device 8 prepared for the respective semiconductor lasers 4. Then, a narrow Nd:YAG (Nd: Yttrium Aluminium Garnet) rod 3 having a diameter of 4 mm and a length of 100 mm stored in the light condensing device 8 was excited by this laser light, so that the laser power was obtained by the stable type resonator constructed of the partial reflection mirror 2 having transmittance of 6%, and also the reflection mirror 1 having reflectivity of 100%.

In the case that total power of the entire semiconductor lasers was 72 W, laser power of 25 W could be produced as the laser beam 70. The slope efficiency of the oscillation characteristic, namely a so-called "light-light slope efficiency" was 48%. This value corresponds to the maximum light-light slope efficiency in the world at the time when the present patent application was made. The narrower the diameter of the rod 3 becomes, the easier the laser beam having better beam quality could be produced. As a consequence, such a fact that the above-described maximum efficiency value could be achieved with employment of such a narrow rod implies that the structure of the solid-state laser amplifying apparatus according to the present invention could produce the laser beam with high quality at higher efficiencies.

It should also be noted that although the plurality of semiconductor lasers 4 were symmetrically arranged on the side surface of the solid-state element 3 in the above-described embodiment 1, the arrangement of the semiconductor lasers is not limited thereto.

In the above-described embodiment, the light condensing device 8 is constructed in such a manner that a plurality of light condensing devices are arranged along the axial direction of the solid-state element 3, and each of these light condensing devices owns the opening portion 80 in order to easily replace the light condensing device and also easily adjust the beam incident position of the respective semiconductor laser. Alternatively, a plurality of opening portions may be provided with a single light condensing device.

Figure 6:
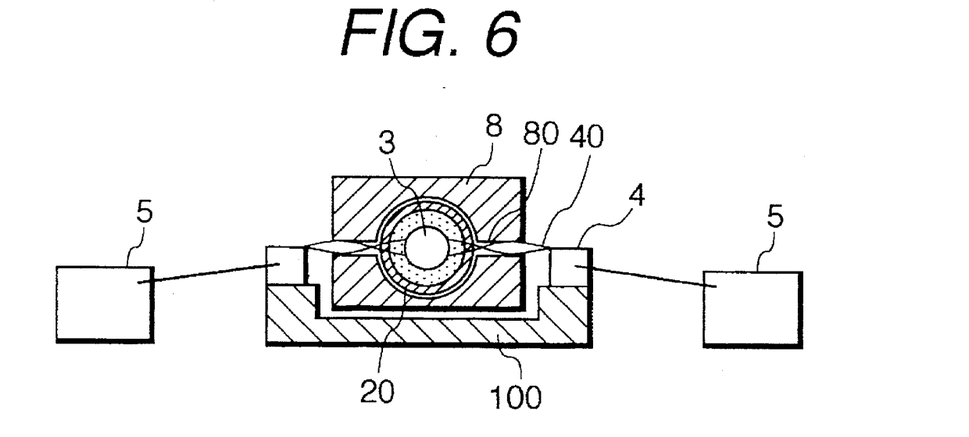
FIG. 6 schematically shows a structure of another solid-state laser apparatus according to the embodiment 1 of the present invention.

Also, in the above-explained embodiment, the light condensing device 8 is constructed in such a manner that this light condensing device 8 is subdivided at the opening portion 80 in the transverse direction along the axial direction of the solid-state element 3, and the flow tube 20 is sandwiched along the upper/lower directions. However, the construction of this light condensing device 8 is not limited to the above-explained structure, but as shown in FIG. 6, may be subdivided along the longitudinal direction to hold the flow tube 20 while sandwiching this flow tube 20 along the right/left direction. Furthermore, this light condensing device may be subdivided into four device portions along the transverse/longitudinal directions.

With the above-described structure, a portion of the subdivided light condensing device is disconnected so that the laser beam pattern projected from the opening portion can be observed. For example, a confirmation can be made that the semiconductor laser light is incident upon the opening portion.

Additionally, with the structure of this embodiment, the light condensing device 8 may be rotated around the flow tube. When it is so arranged that the position of the opening portion is varied, and the incident position of the excitation light is changed, the stolid-state element may be further excited uniformly, as compared with the above-described case. Accordingly, the laser amplification with high quality can be performed.

As described above since the solid-state laser apparatus according to this embodiment is constructed in such a manner that the solid-state element is arranged within the light condensing device whose inner surface is made of the diffusion/reflection surface and the excitation light is conducted from the opening portion so as to excite the solid-state element, the solid-state element can be uniformly excited at higher efficiency.

Also, since the solid-state laser apparatus is so constructed that the excitation light is converted into such a diffusion/reflection-shaped beam having no relationship with the diverging angle of the excitation light and the beam quality and the solid-state element can be excited by this diffusion/reflection-shaped laser beam, the solid-state element can be excited substantially irrelevant to the diverging condition of the incident beam, the beam mode, and the incident position to the opening position. As a consequence, the solid-state element can be oscillated under stable condition in response to even mechanical vibrations, and also the excitation light source may be replaced Without further requiring readjustment.

Further, as the light condensing devices are supported in such a manner that the flow tube is sandwiched by the surroundings of the solid-state element, the stable relationship can be established between the light condensing device and the solid-state element, and then the stable operation can be realized. Also, a center of the flow tube, namely a center of the solid-state element may be made coincident with a center of the light condensing device, so that more uniform laser excitation can be achieved.

(EMBODIMENT 2)

Figure 7A:
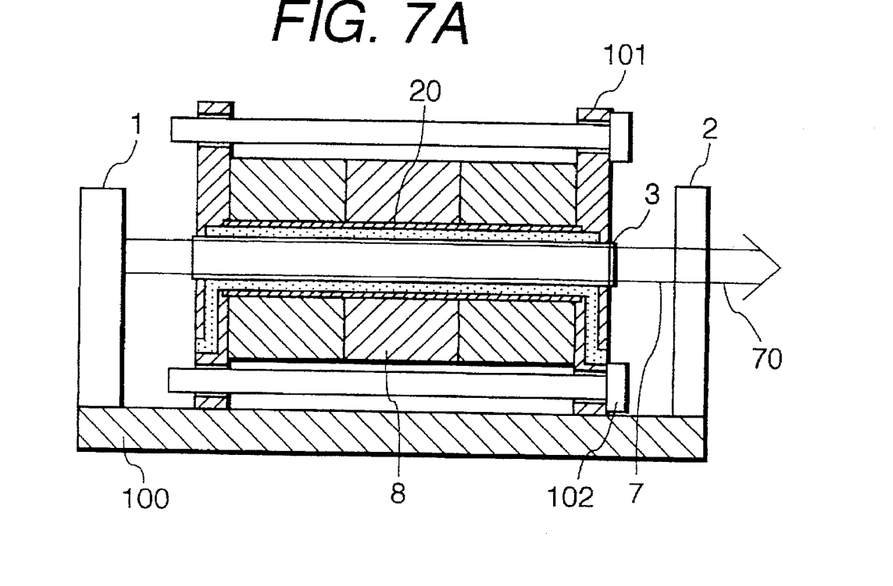
Figure 7B:
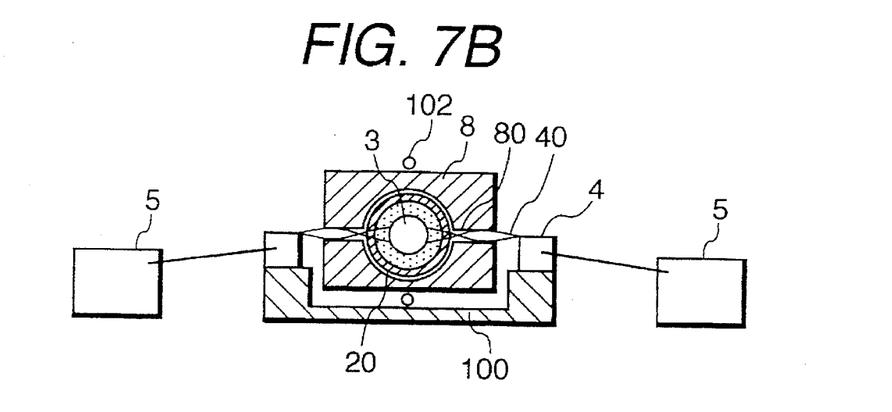
Figure 7C:
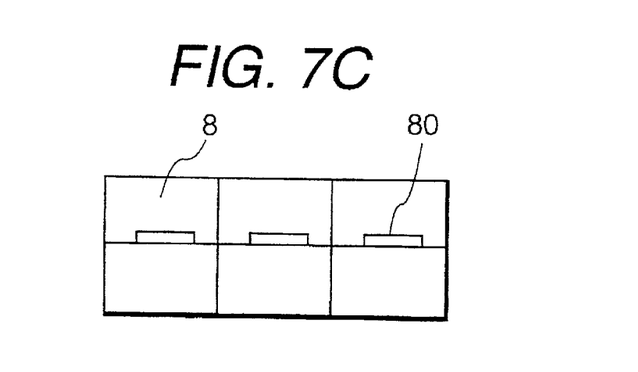

FIG. 7 is a structural diagram for schematically representing a solid-state laser apparatus according to an embodiment 2 of the present invention. FIG. 7A is a cross-sectional view of this solid-state laser apparatus, FIG. 7B is a longitudinal-sectional view thereof, and FIG. 7C is a side structural diagram of a light condensing device, as viewed from the transverse direction. In the embodiment 1, such a structure is represented that the light condensing device 8 is held around the solid-state element by sandwiching the flow tube 20. Alternatively, both of the edge portions of the light condensing device may be mechanically fixed on a side plate for supporting the flow tube 20 by using a screw. Otherwise, as represented in FIG. 7, a screw 102 for coupling two side plates 101 is provided, and a distance between these two side plates 101 is variable by this screw 102. After the light condensing light 8 has been stored between these two side plates 101, the distance between the two side plates may be shortened to hold the light condensing device 8 under pressure condition.

With employing this structure, a relationship between the light condensing device and the solid-state element can be made stable, so that the stable operation can be realized. Also, a center of the flow tube, namely a center of the solid-state element may be made coincident with a center of the light condensing device, so that more uniform laser excitation can be achieved.

Furthermore, also in the structure of this embodiment, the light condensing device 8 may be rotated around the flow tube. When it is so arranged that the position of the opening position is varied, and the incident position of the excitation light is changed, the solid-state element may be further excited uniformly, as compared with the above-described case. Accordingly, the laser amplification with high quality can be performed.

(EMBODIMENT 3)

Figure 8A:
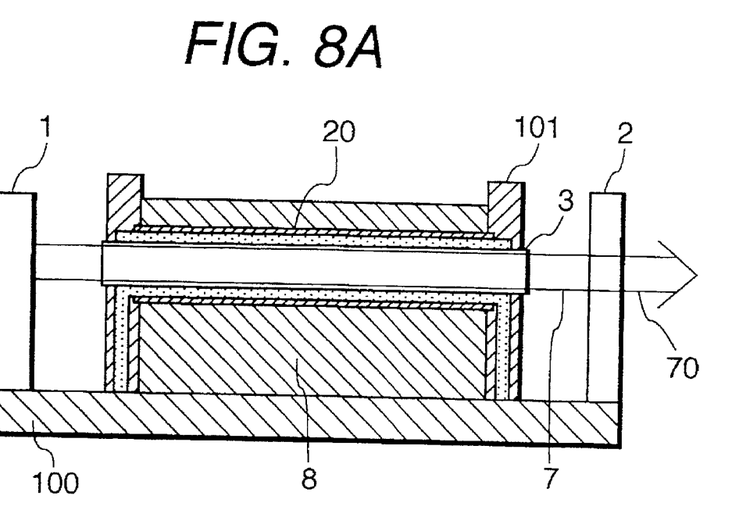
FIGS. 8A to 8C schematically indicate a structure of a solid-state laser apparatus according to an embodiment 3 of the present invention.
Figure 8B:
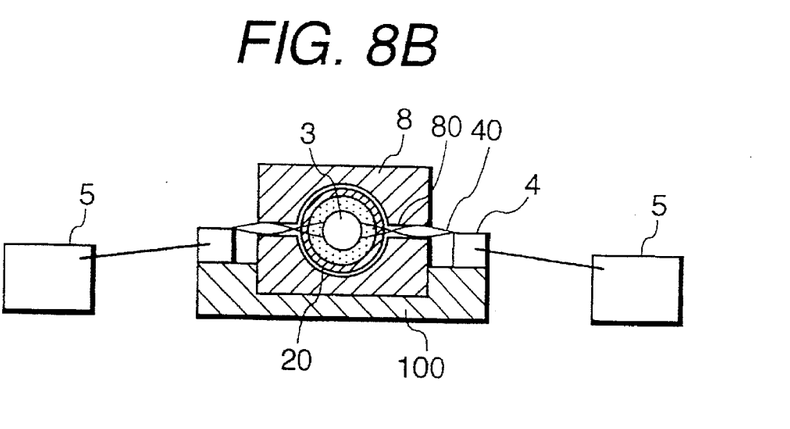
Figure 8C:
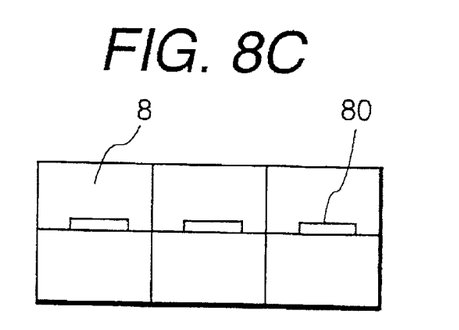

FIG. 8 is a structural diagram for schematically representing a solid-state laser apparatus according to an embodiment 3 of the present invention. FIG. 8A is a cross-sectional view of this solid-state laser apparatus, FIG. 8B is a longitudinal-sectional view thereof, and FIG. 8C is a side structural diagram of a light condensing device, as viewed from the transverse direction. Furthermore, as the manner to hold the light condensing device 8, as represented in FIG. 8, the light condensing device 8 may be fixed on a base plate 100. In this case, although the light condensing device 8 may be separated from a side plate 101, a height of the solid-state element 3 with respect to the base plate 100 must be adjusted. For instance, either an adjustment apparatus may be employed so as to adjust the height of the solid-state element 3 in such a manner that the center of the light condensing device 8 is made coincident with the center of the flow tube 2, namely the center of the solid-state element 3, or the holding structure for the light condensing device may be designed with proper mechanical precision.

As described above, since the light condensing device 8 is supported by the base plate 100 separately provided with the side plate 100 for supporting the flow tube 20, the light condensing device 8 can be readily disconnected, or removed from the base plate 100. When the interior of this light condensing device is dirtied, the dirty light condensing device can be quickly replaced by a new one.

(EMBODIMENT 4)

Figure 9A:
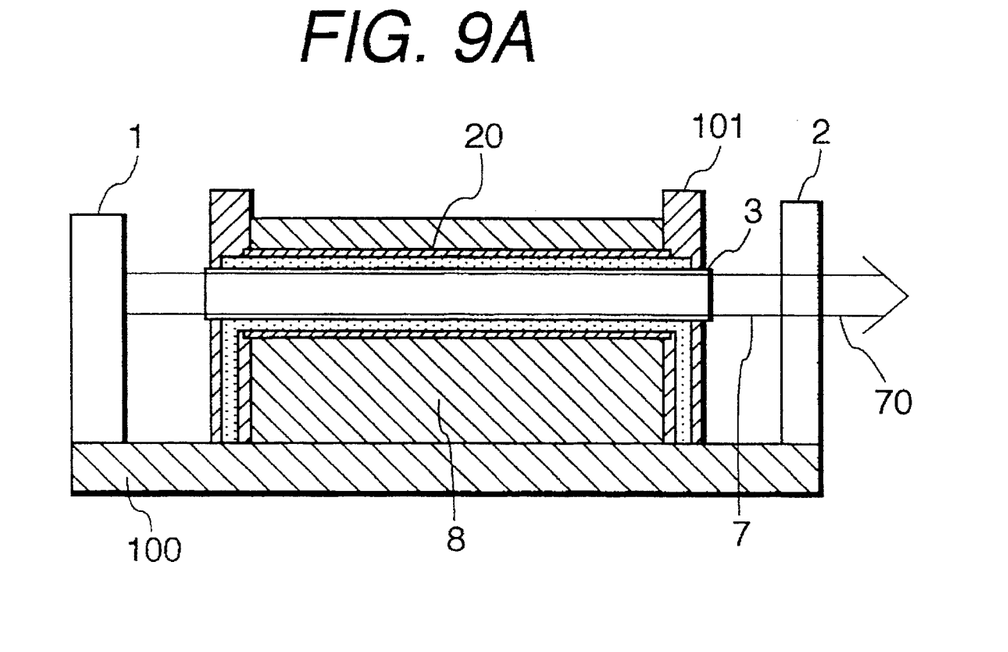
FIGS. 9A to 9B schematically indicate a structure of a solid-state laser apparatus according to an embodiment 4 of the present invention.
Figure 9B:
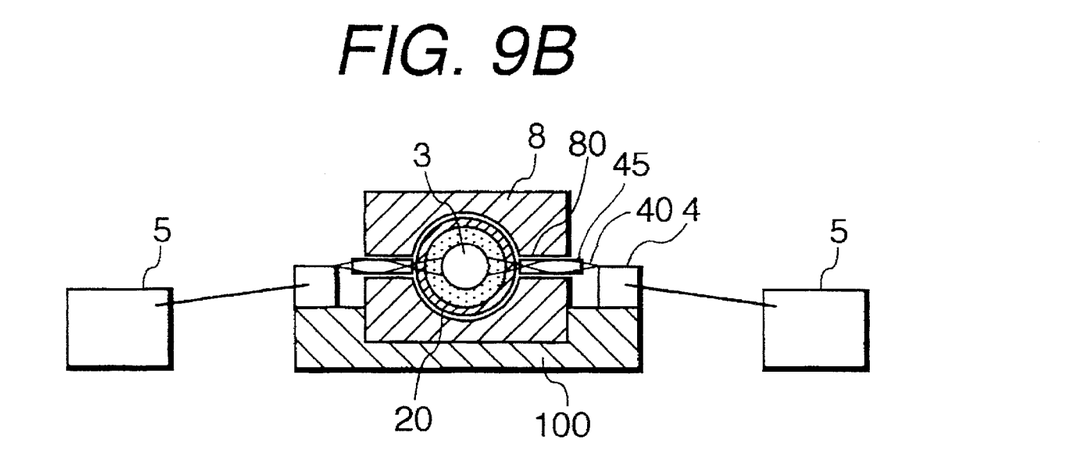

FIG. 9 is a sectional view for showing a structure of a major portion of a solid-state laser apparatus according to a embodiment 4 of the present invention. FIG. 9A is a cross-sectional view of this solid-state laser apparatus, and FIG. 9B is a longitudinal-sectional view thereof. In this drawing, reference numeral 45 denotes an optional waveguide element for guiding the excitation light 40, which is made of either sapphire, or non-doped YAG, and is arranged within the opening portion 80.

Similar to the above-explained embodiments 1 to 3, in the solid-state laser apparatus with the above-described structure, the solid-state element 3 containing the activated solid-state medium is arranged within the light condensing device made of, e.g., ceramic whose inner surface is constructed of the diffusion/reflection surface. The solid-state element 3 is excited by the excitation light 40 which is emitted from the semiconductor laser 4 and conducted from the opening portion 80, and then becomes the laser amplification medium for amplifying the laser beam. The natural (spontaneous) emission light emitted from the laser amplification medium is amplified while the natural emission light is reciprocated between the resonators arranged by the mirror 1 and the mirror 2, so that this natural emission light becomes the laser beam 7 with better directivity. When intensity of this laser beam 7 reaches a preselected value, this laser beam 7 is projected as the laser beam 70 outside the laser amplifying medium.

Operations of the optical waveguide element 45 constituting the features of this embodiment will now be described. The edge surface of the optical waveguide element 45 is coated by a non-reflection coat with respect to the excitation light so that the light emitted from the excitation light source 4 may be conducted into the optical waveguide element 45 with substantially no loss. The optical waveguide element 45 is made of either sapphire, or YAG (Yttrium Aluminum Garnet). Since the refractive index of this optical waveguide element 45 is large, say approximately 1.7 to 1.8, the excitation light obliquely incident on the optical waveguide element 45 is totally reflected by the upper and lower surfaces of the optical waveguide element 45, and therefore is conducted into the light condensing device with substantially no loss. Actually, the transmission characteristic higher than 95% could be proved by the experiment.

In addition, the optical waveguide element 45 owns another effect to uniform the spatial distribution of the excitation light.

Although the central light portion among the entire light emitted from the excitation light source 5 constructed of, for instance, a semiconductor laser may pass through the optical waveguide element 45 without being totally reflected, the peripheral light portion is totally reflected, so that this peripheral light portion is folded to the central portion, and then is conducted from the optical waveguide element 45 into the light condensing device. In this manner, the central light portion is mixed with the peripheral light portion, so that the intensity distribution of the excitation light can be made constant. When the intensity distribution of the excitation light is uniformed in the above-described manner to thereby be conducted into the light condensing device, the effect of uniforming excitation of the solid-state element by the diffusion/reflection of the light condensing device can be increased.

It should be noted that as the optical waveguide element 45, an optical element for transmitting light by way of the total reflection caused by an optical thin film formed on a side surface thereof may be employed to construct the optical waveguide element in a similar manner to that of FIG. 9, for instance, such an element that a thin film of, e.g., gold, aluminum, or magnesium fluoride has been vapor-deposited on, e.g., glass or melted quartz may be employed. In this case, since low-cost materials can be utilized, there is another merit that the entire apparatus can be manufactured at low cost.

Figure 10A:
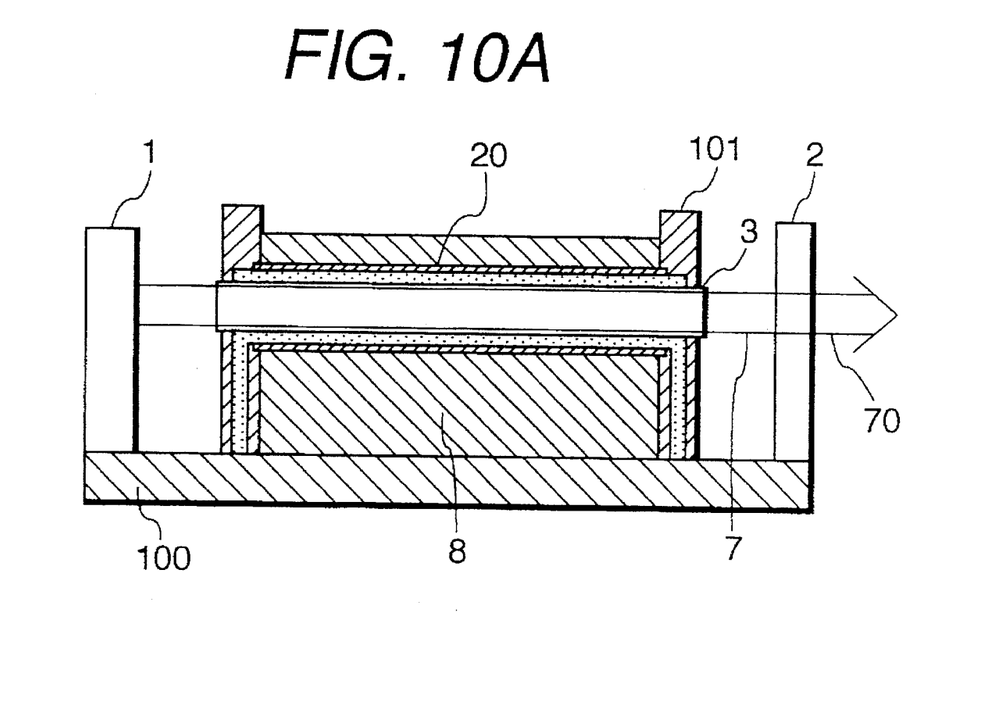
FIGS. 10A and 10B schematically represent a structure of another solid-state laser apparatus according to the embodiment 4 of the present invention.
Figure 10B:
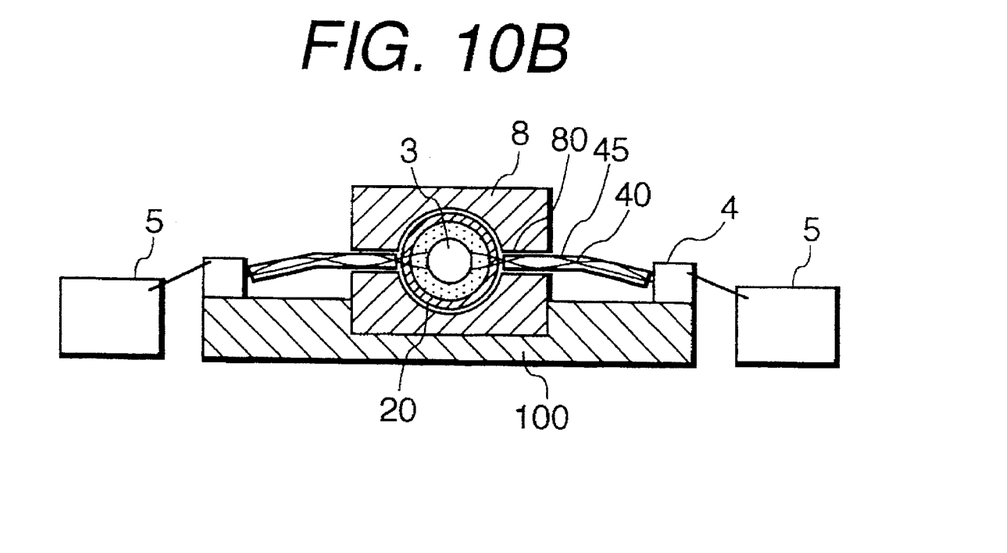

Also, such an optical element for transmitting light by the lens effect with smooth changes in the inner refraction index, for instance, an optical fiber may be employed to be constructed as illustrated in FIG. 10 as this optical waveguide element 45. In this case, since the excitation light can be conducted while keeping the beam quality of the excitation light source, the excitation light with the stable quality can be conducted into the light condensing device without being adversely influenced by the length of the optical element for conducting the excitation light, so that the excitation distribution inside the solid-state element can be made stable and thus the laser amplification with high quality can be achieved.

Also, when the optical waveguide element 45 is employed, the opening portion of the light condensing device can be tightly closed by this optical waveguide element 45, so that the flow tube 20 is eliminated, and the cooling agent may flow through the light condensing device. As a consequence, the interior portion of this light condensing device may fill the role of this flow tube 20.

Further, the optical waveguide element 45 may be integrally arranged within the same package with the light source 4. As a result, while maintaining the positional adjusting condition between the light source 4 and the optical element 45, the incident position of the optical waveguide element 45 with respect to the rod side surface can be easily changed. For instance, when the light condensing device 8 is rotatably arranged with respect to the structures of the embodiment 1 and the embodiment 2, an then the position of the opening portion 80 is varied so as to change the incident position of the excitation light into the solid-state element, if the excitation light is conducted by employing the optical waveguide element 45 integrally manufactured with the light source 4, then the transmission efficiency of the excitation light would not be changed even when the positional shift would occur and the incident angle would be changed. Thus, the excitation light can be conducted under stable condition.

(EMBODIMENT 5)

Figure 11A:
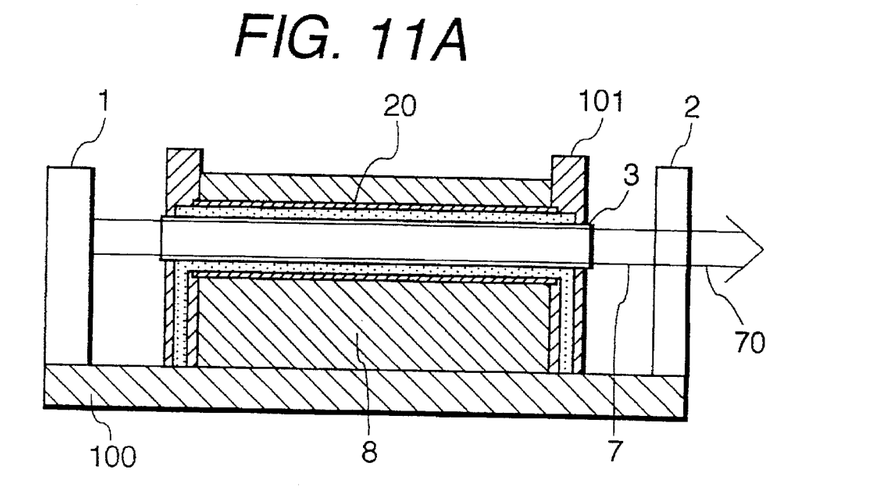
FIGS. 11A to 11C schematically indicate a structure of a solid-state laser apparatus according to an embodiment 5 of the present invention.
Figure 11B:
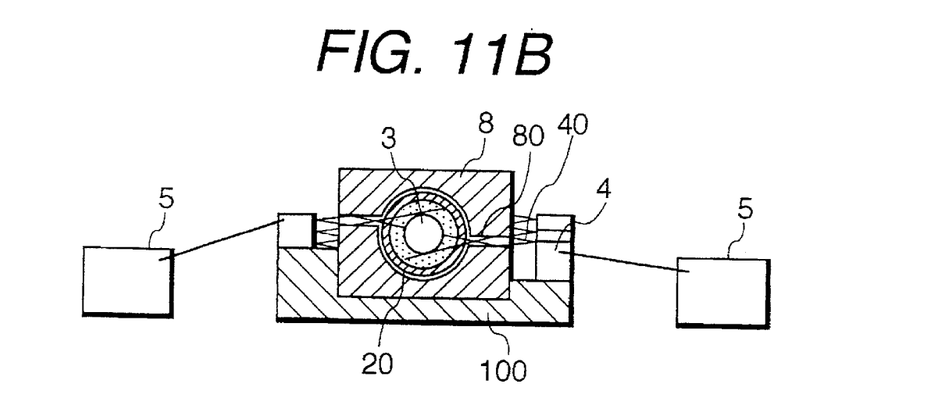
Figure 11C:
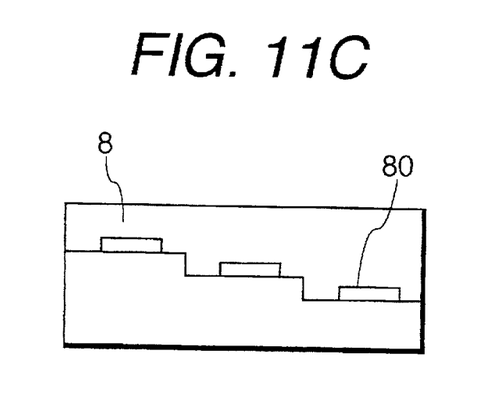

FIG. 11 is a structural diagram of a solid-state laser apparatus according to an embodiment 5 of the present invention. More specifically, FIG. 11A is a cross-sectional view of the solid-state laser apparatus of the embodiment 5, FIG. 11B is a longitudinal-sectional view of this solid-state laser apparatus, and FIG. 11C is a side surface structural diagram of a light condensing device, as viewed from the transverse direction. In this embodiment, as shown in FIG. 11, the position of the opening portion 80 formed in the light condensing device 8 is changed along the height direction. As a consequence, the setting position of the excitation light source 4 is also changed along the height direction.

Similar to the above-described embodiments 1 to 3, in the solid-state laser apparatus according to this embodiment 5, the solid-state element 3 containing the activated solid-state medium is positioned within the light condensing device made of, e.g., ceramic whose inner surface is constructed of the diffusion/reflection surface. The solid-state element 3 is excited by the excitation light 40 which is emitted from the semiconductor laser 4 and conducted from the opening portion 80, and then becomes the laser amplifying medium for amplifying the laser beam. The natural (spontaneous) emission light emitted from the laser amplifying medium is amplified while the natural emission light is reciprocated between the resonators arranged by the mirror 1 and the mirror 2, so that this natural emission light becomes the laser beam 7 with better directivity. When intensity of this laser beam 7 reaches a preselected value, this laser beam 7 is projected as the laser beam 70 outside the laser amplifying medium.

Additionally, a description will now be made of the featured arrangement of the opening portion 80 according to the embodiment 5. That is, in accordance with this embodiment, three sets of paired semiconductor lasers 4 located opposite to each other are arranged along the axial direction of the solid-state element, namely six semiconductor elements are arranged in total. The incident positions of the excitation light onto the solid-state elements are made substantially uniform in such a manner that these excitation-light incident positions are not concentrated into a specific location, as viewed from the axial direction of the solid-state elements. Since the amplification factor the solid-state element is expressed by the integrated value of the total number of these solid-state elements, when the incident positions of the plural excitation light, as viewed from the axial direction, are made uniform, the amplification factor of the solid-state element within the sectional view also becomes uniform, so that the laser beam with high quality can be readily produced and amplified.

FIG. 11, there is shown such an arrangement that two semiconductor lasers are arranged in each of the stages so as to uniform the excitation-light incident positions onto the solid-state element. However, the present invention is not limited to this laser arrangement. In summary, uniformity of the amplification distribution within the sectional view of the solid-state element can be greatly improved if a plurality of opening portions are provided on the side surface of the light condensing device, and also the positions of this solid-state element, as viewed from the axial direction, are changed in the place of at least one opening portion. It should be understood that when the light incident power derived from the excitation light source is increased, the more equal arrangement of the excitation-light incident position is required so as to produce/amplify the laser beam with high quality. Under such a circumstance, the above-described arrangement could especially provide effective merits.

Also in this embodiment 5, it is conceivable to construct an arrangement with employment of the optical waveguide element 45 which has been used in the previous embodiment 4. As previously explained, in such an arrangement, a further uniform amplification distribution can be obtained, since the effects to uniform the excitation light caused by the optical waveguide element 45 can be effectively achieved.

(EMBODIMENT 6)

Figure 12A:
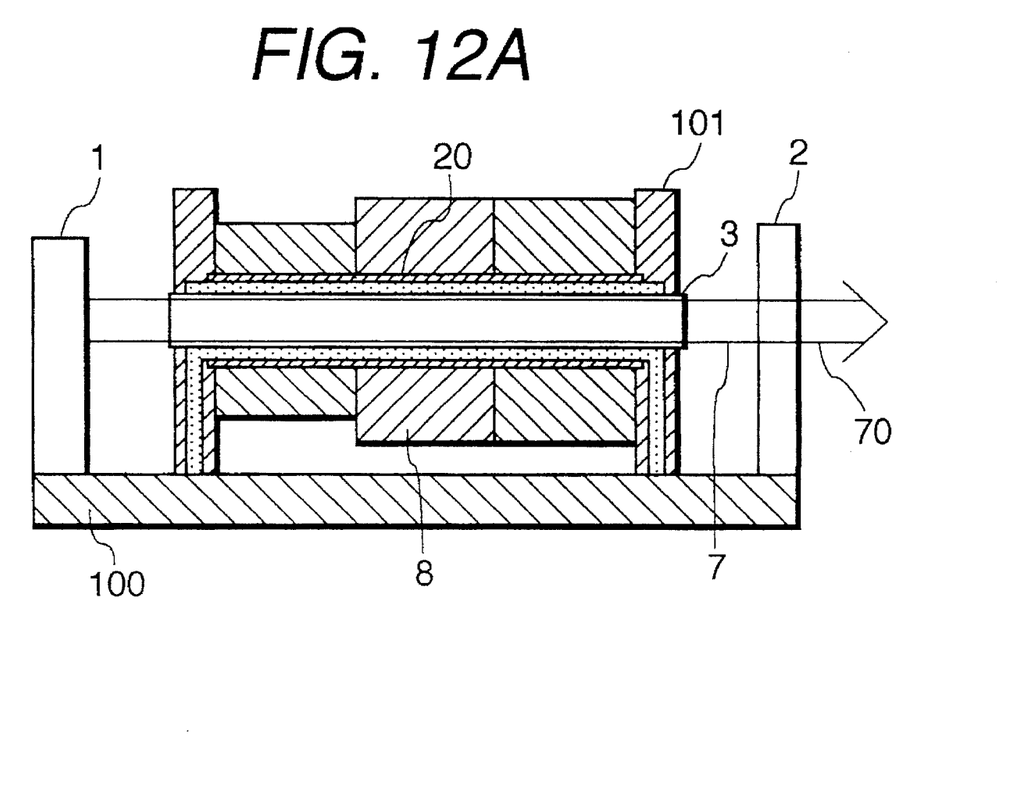
FIGS. 12A and 12B schematically indicate a structure of a solid-state laser apparatus according to an embodiment 6 of the present invention.
Figure 12B:
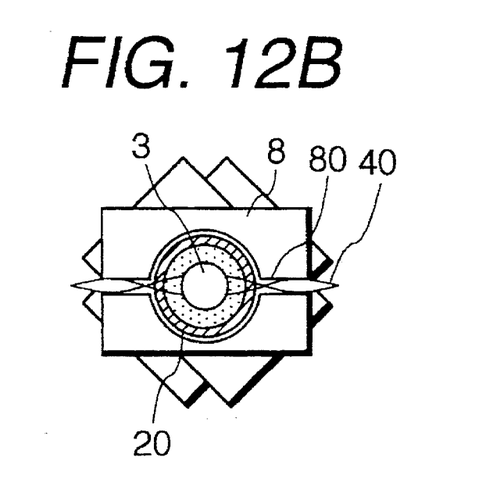

Although the position of the opening portion 80 provided on the light condensing device 8 is varied in the embodiment 5, alternatively, it is possible to arrange an embodiment 6 as follows. That is, the light condensing device 8 shown in the embodiment 1 may be sandwiched by the flow tube 20 so as to be fixed, and the light condensing device 8 may be rotated around the flow tube 20, so that the solid-state element 3 may be uniformly excited from the peripheral portions within the sectional view, as viewed from the axial direction. FIG. 12 illustrates one example of such an arrangement. FIG. 12A is a cross-sectional view of this arrangement, whereas FIG. 12B represents such a condition that a light condensing device portion is derived therefrom, and this light condensing device portion is rotated, as viewed along the axial direction of the solid-state element. In this case, since a plurality of light condensing devices 8 split along the axial direction are independently, freely rotated, the optimum position thereof may be determined, while observing quality of the oscillating laser beam.

The above-described embodiment 6 has been applied to the structure of the embodiment 1. Alternatively, this structure according to the embodiment 6 may be applied to such an arrangement of the embodiment 2 that the light condensing device 8 is sandwiched by the side plate 101 to be fixed, and while the light condensing device 8 is rotated around the flow tube 20, the solid-state element 3 is uniformly excited from the peripheral portion thereof within the sectional view, as viewed from the axial direction of the solid-state element 3. Also in this case, since a plurality of light condensing device 8 split along the axial direction are independently, freely rotated, the optimum position thereof may be determined, while observing quality of the oscillating laser beam.

(EMBODIMENT 7)

Figure 13:
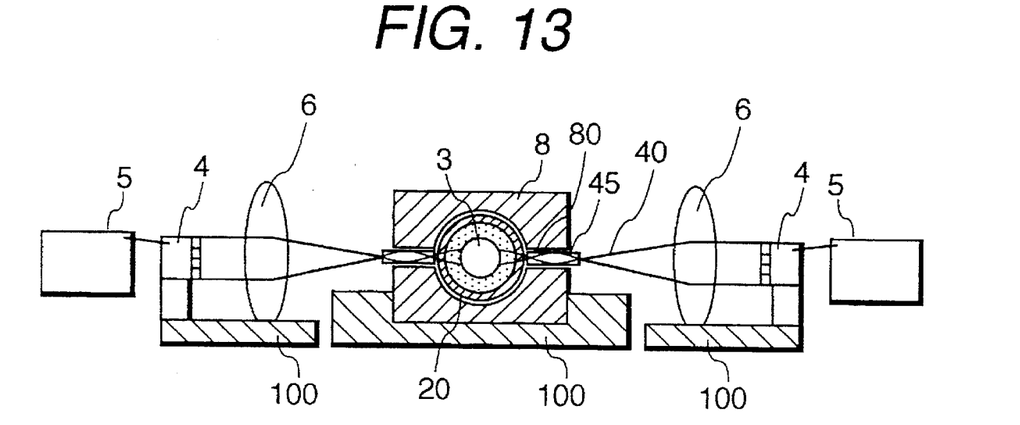
FIG. 13 schematically indicates a structure of a solid-state laser apparatus according to an embodiment 7 of the present invention.

While the semiconductor laser has been employed as the excitation light source and the excited laser beam has been directly conducted into the opening portion of either the light condensing device, or the optical waveguide element in any of the above-explained embodiments, the present invention is not limited thereto. For instance, other excitation light sources such as an ion laser may be employed. Also, as illustrated in FIG. 13, it may be so constructed that a pulse laser beam having a plane shape emitted from a pulse semiconductor laser 20 is conducted to the opening portion 80 by employing the condenser lens 6. In summary, it is sufficient that the laser light may be conducted to the opening portion 80 proved on the light condensing device 8.

(EMBODIMENT 8)

Figure 14:
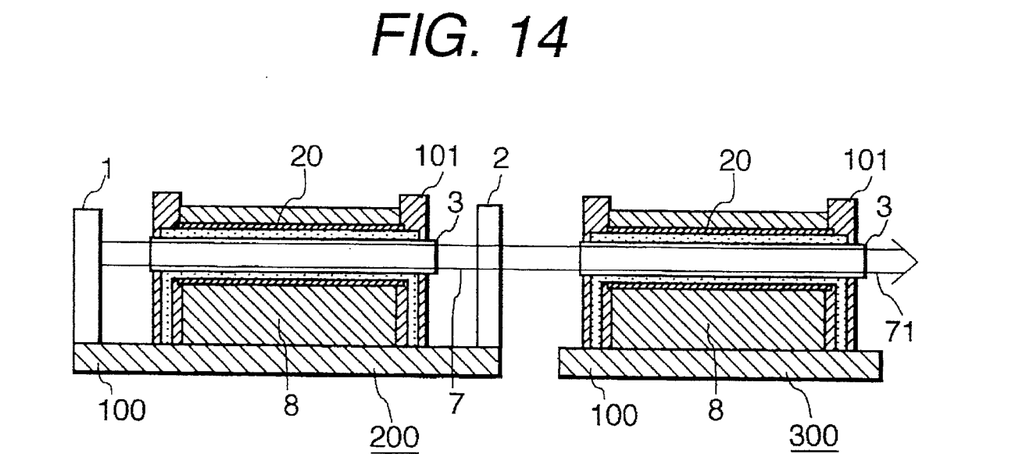
FIG. 14 schematically indicates a structure of a solid-state laser apparatus according to an embodiment 8 of the present invention.

In any of the above-described embodiments, such an arrangement has been employed that the solid-state element excited by the excitation light source is used as the amplifying medium, and then the laser beam is derived from this amplifying medium by way of the laser resonator. Alternatively, the amplifying medium may be employed as a solid-state laser amplifying apparatus. In FIG. 14, there is shown such an example that a laser beam 70 derived from a solid-state laser apparatus 200 by the laser resonators 1 and 2 is amplified by a solid-state laser amplifying apparatus 300, thereby being externally derived as a laser beam 71.

Furthermore, it should be noted that although the sectional shapes of the solid-state elements and the flow tubes are circle in any of the above-described embodiments, the present invention is not limited thereto, but other shapes such as rectangular shapes and elliptical shapes may be employed.

Also, it should be noted that although not especially explained in any of the above-described embodiments, the light penetration loss could be reduced when a non-reflection thin film would be formed on such not specifically indicated portions of the side surface of the flow tube, the optical element and the like, through which the laser beam passes. As a consequence, the laser oscillation can be realized in a high efficiency.

Although Nd:YAG has been employed as the solid-state element in the above-explained embodiment, the present invention is not limited thereto, but any types of solid-state elements which can be excited by light may be employed as this solid-state element.

In accordance with the present invention as recited in aspect 1, the solid-state laser amplifying apparatus is arranged by the solid-state element containing the activated solid-state medium, the flow tube for causing the cooling medium to flow therethrough so as to cooling down this solid-state element, and the light condensing device positioned to surround the solid-state element, for holding the flow tube by directly, or indirectly sandwiching this flow tube, the inner surface of which is made of the diffusion/reflection surface. Further, the solid-state laser amplifying apparatus is constructed of the excitation light source arranged outside the light condensing device, for emitting the excitation light used to excite the solid-state element, and the opening portion provided with the light condensing device, for conducting the excitation light. As a result, such a solid-state laser amplifying apparatus capable of producing the high-power laser beam with high quality under stable condition can be obtained with having a simple structure at low cost.

In accordance with the present invention as recited in aspect 2, since the both edge portions of the light condensing device can be held by the side plates, such a solid-state laser amplifying apparatus capable of emitting the high-power laser beam with high quality under stable condition can be similarly constructed at low cost.

In accordance with the present invention as recited in aspect 3, since the light condensing device is supported by the base plate independent from the side plate for supporting the flow tube, the light condensing device may be easily derived from the solid-state laser amplifying apparatus, resulting in quick replacement of the light condensing device.

In accordance with the present invention as recited in aspect 4, it is so arranged that the excitation light emitted from the excitation light source is conducted into either the surroundings of the opening portion of the light condensing device, or the surroundings of the solid-state element by way of the internal total reflection by employing the optical element for transferring the incident light by way of the internal total reflection. Accordingly, the light of the excitation light source can be conducted without any loss inside the light condensing device, and further the intensity distribution of the excitation light can be made uniform, so that since the excitation light is uniformly diffused and reflected with the light condensing device, the solid-state element can be excited under highly uniform state, and the laser with high quality can be amplified in high efficiency.

According to the present invention as recited in aspect 5, since with respect to the solid-state laser amplifying apparatus defined by the above-explained aspects 1 to 3, the optical element for transferring the incident light by way of the internal total reflection is employed so as to conduct the excitation light to either the peripheral portions of the opening portion, or the peripheral portion of the solid-state element, the excitation light can be stably conducted when the light condensing device is rotated around the flow tube to change the excitation position with regard to the solid-state element in addition to the above-described effects.

According to the present invention as recited in aspect 6, since the excitation light emitted from the excitation light source is conducted to either the peripheral portion of the opening portion of the light condensing device, or the peripheral portion of the solid-state element by employing the optical element for transferring the incident light by way of the total reflection caused by the optical thin film formed on the side surface thereof, a similar effect to that of the above-explained aspect 4 can be achieved. Also, since the low cost material maybe employed, the total cost of this solid-state laser amplifying apparatus can be reduced.

According to the present invention as recited in aspect 7, since the excitation light is conducted to either the peripheral portion of the opening portion of the light condensing device, or the peripheral portion of the solid-state element by employing the optical element for transferring the incident light by way of the total reflection, caused by the optical thin film formed on the side surface thereof, a similar effect to that of the above-explained aspect 5 can be achieved with respect to the solid-state laser amplifying apparatus defined in the above-explained aspects 1 to 3.

Also, in accordance with the present invention as recited in aspect 8, since the excitation light emitted from the excitation light source is conducted to either the peripheral portion of the opening portion of the light condensing device, or the peripheral portion of the solid-state element by using the optical element having the refractive index distributed in a lens shape, a similar effect to that of the above-described aspect 4 may be achieved. Further, the excitation light with stable quality can be conducted inside the light condensing device without being adversely affected by the length of the optical element, so that the laser with high quality can be amplified.

Also, in accordance with the present invention as recited in aspect 9, since the excitation light emitted from the excitation light source is conducted to either the peripheral portion of the opening portion of the light condensing device, or the peripheral portion of the solid-state element by using the optical element having the refractive index distributed in a lens shape, a Similar effect to that of the above-described aspect 5 may be achieved with respect to the apparatus of aspects 1 to 3.

In accordance with the present invention as recited in aspect 10, as the optical element is so arranged as to be integrally formed with the excitation light source, even when the incident position of the excitation light onto the solid-state element is changed, the positional relationship between the excitation light source and the solid-state element can be maintained constant, and further the adjustment of the excitation distribution can be easily performed.

According to the present invention recited in aspect 11, a plurality of opening portions are provided, and the positions of these plural opening portions are varied in at least one place, as viewed from the axial direction of the solid-state element. Therefore, such a uniform excitation distribution can be realized and the laser can be amplified with high quality.

The accordance with the present invention recited in aspect 12, as to the apparatus defined in the above-explained aspects 1 to 10, since a plurality of opening portions are provided and the positions of these plural opening portions are varied in at least one place, as viewed from the axial direction of the solid-state element, such a uniform excitation distribution can be realized as well as the laser amplification with high quality can be achieved. In addition, when the light condensing device is rotated around the flow tube to change the excitation position to the solid-state element, the optimum position can be determined while observing the quality of the oscillating laser beam. In the case that the optical element is employed, the effect to uniform the excitation light can become effective, so that a further uniform amplification distribution can be achieved.

Since the semiconductor laser is employed as the excitation light source in accordance with the present invention as defined in aspect 13, the high-power excitation light can be produced at a high efficiency from such a compact excitation light source, and then the laser amplification with high quality can be performed at a high efficiency.

In accordance with the present invention recited in aspect 14, it is so constructed that the laser resonator is employed and the laser beam is derived from the solid-state element excited by the light emitted from the excitation light source. As a consequence, the laser beam with high quality can be produced at a high efficiency.

What is claimed is:

1. A solid-state laser amplifying apparatus, comprising:
 a solid-state element containing an activated solid medium;
 a flow tube for carrying and transporting a cooling medium used to cool said solid-state element;
 a light condensing device arranged so as to surround said solid-state element and substantially sandwich said flow tube, an inner surface of said light condensing device being formed as a diffusion/reflection surface;
 an excitation light source arranged outside said light condensing device, for emitting excitation light used to excite said solid-state element; and
 an opening portion provided within said light condensing device, for conducting the excitation light.

2. The solid-state laser amplifying apparatus of claim 1, further comprising:
 an optical element for transferring light projected from said excitation light source to one of a peripheral portion of said opening portion and a peripheral portion of said solid-state element by internal total reflection.

3. The solid-state laser amplifying apparatus of claim 1, further comprising:
 an optical element for transferring said projected light to one of a peripheral portion of said opening portion and a peripheral portion of said solid-state element.

4. The solid-state laser amplifying apparatus of claim 1, further comprising:

an optical element having a refractive index distributed in a lens shape, for transferring the light projected from said excitation light source to one of a peripheral portion of said opening portion and a peripheral portion of said solid-state element.

5. The solid-state laser amplifying apparatus of claim 1, further comprising:

a plurality of said opening portions, positions of said plural opening portions being varied along a height direction of said light condensing device in at least one place, as viewed from an axial direction of said solid-state element.

6. A solid-state laser amplifying apparatus, comprising:

a solid-state element containing an activated solid medium;

a flow tube for carrying and transporting a cooling medium used to cool said solid-state element;

a light condensing device arranged so as to surround said solid-state element and substantially sandwich said flow tube, an inner surface of said light condensing device being formed as a diffusion/reflection surface;

a side plate for holding both edge portions of said light condensing device;

an excitation light source arranged outside said light condensing device, for emitting excitation light used to excite said solid-state element; and an opening portion provided within said light condensing device, for conducting said excitation light.

7. The solid-state laser amplifying apparatus of claim 6, further comprising:

an optical element for transferring light projected from said excitation light source to one of a peripheral portion of said opening portion and a peripheral portion of said solid-state element by internal total reflection.

8. The solid-state laser amplifying apparatus of claim 6, further comprising:

an optical element for transferring said projected light to one of a peripheral portion of said opening portion and a peripheral portion of said solid-state element.

9. The solid-state laser amplifying apparatus of claim 6, further comprising:

an optical element having a refractive index distributed in a lens shape, for transferring the light projected from said excitation light source to one of a peripheral portion of said opening portion and a peripheral portion of said solid-state element.

10. The solid-state laser amplifying apparatus of claim 6, further comprising:

a plurality of said opening portions, positions of said plural opening portions being varied along a height direction of said light condensing device in at least one place, as viewed from an axial direction of said solid-state element.

11. A solid-state laser amplifying apparatus, comprising:

a solid-state element containing an activated solid medium;

a flow tube for carrying and transporting a cooling medium used to cool said solid-state element;

a light condensing device arranged so as to surround said solid-state element and substantially sandwich said flow tube, an inner surface of said light condensing device being formed as a diffusion/reflection surface;

a base plate for holding said light condensing device;

an excitation light source arranged outside said light condensing device, for emitting excitation light used to excite said solid-state element; and an opening portion provided within said light condensing device, for conducting said excitation light.

12. The solid-state laser amplifying apparatus of claim 11, further comprising:

an optical element for transferring light projected from said excitation light source to one of a peripheral portion of said opening portion and a peripheral portion of said solid-state element by internal total reflection.

13. The solid-state laser amplifying apparatus of claim 11, further comprising:

an optical element for transferring said projected light to one of a peripheral portion of said opening portion and a peripheral portion of said solid-state element.

14. The solid-state laser amplifying apparatus of claim 11, further comprising:

an optical element having a refractive index distributed in a lens shape, for transferring the light projected from said excitation light source to one of a peripheral portion of said opening portion and a peripheral portion of said solid-state element.

15. The solid-state laser amplifying apparatus of claim 11, further comprising:

a plurality of said opening portions, positions of said plural opening portions being varied along a height direction of said light condensing device in at least one place, as viewed from an axial direction of said solid-state element.

* * * * *